(12) United States Patent
Hill (10) Patent No.: US 7,331,637 B2
(45) Date of Patent: Feb. 19, 2008

(54) DUAL MOUNTABLE CAST COMMERCIAL VEHICLE WHEELS WITH SPOKES

(75) Inventor: Ross S. Hill, Lansing, MI (US)

(73) Assignee: Hayes Lemmerz International, Inc., Northville, MI (US)

( * ) Notice: Subject to any disclaimer, the term of this patent is extended or adjusted under 35 U.S.C. 154(b) by 23 days.

(21) Appl. No.: 11/272,279

(22) Filed: Nov. 11, 2005

(65) Prior Publication Data

US 2007/0108835 A1 May 17, 2007

(51) Int. Cl.
*B60B 1/00* (2006.01)
*B60B 11/00* (2006.01)

(52) U.S. Cl. .................. 301/35.628; 301/36.1
(58) Field of Classification Search ........... 301/35.628, 301/36.1–36.3, 35.59, 35.621, 35.626, 35.627, 301/64.101, 64.102, 35.629
See application file for complete search history.

(56) References Cited

U.S. PATENT DOCUMENTS

| 1,629,903 | A | * | 5/1927 | Benedict et al. ....... 301/35.628 |
| 2,195,590 | A | * | 4/1940 | Eksergian .................. 301/36.1 |
| 2,507,285 | A | * | 5/1950 | Temple ...................... 301/36.1 |
| 2,597,835 | A | * | 5/1952 | Eksergian .............. 301/35.622 |
| 3,990,747 | A | | 11/1976 | Long |
| 4,005,907 | A | | 2/1977 | Bonomo |
| 4,070,066 | A | | 1/1978 | Reppert et al. |
| 4,214,792 | A | | 7/1980 | Hardwicke et al. |
| 4,333,688 | A | | 6/1982 | Lemmon et al. |
| 4,521,059 | A | | 6/1985 | Saruwatari |
| 4,585,276 | A | | 4/1986 | Tirheimer |
| 4,772,074 | A | | 9/1988 | Brieser et al. |
| 4,787,679 | A | | 11/1988 | Arnold |
| 4,832,413 | A | | 5/1989 | Waggoner |
| 5,100,205 | A | | 3/1992 | Hardwicke |
| 5,544,945 | A | * | 8/1996 | Daudi .................... 301/64.101 |
| 6,070,946 | A | | 6/2000 | Holmes |
| 6,213,885 | B1 | | 4/2001 | Bachle |
| 6,250,722 | B1 | | 6/2001 | Radke |
| 6,568,764 | B2 | | 5/2003 | McNeil et al. |
| 6,754,957 | B2 | * | 6/2004 | Coleman et al. ........ 301/64.101 |
| 7,059,685 | B2 | * | 6/2006 | Kermelk et al. ........ 301/64.101 |
| 7,104,611 | B2 | * | 9/2006 | Alff et al. .............. 301/63.107 |

* cited by examiner

*Primary Examiner*—Jason R. Bellinger
(74) *Attorney, Agent, or Firm*—MacMillan, Sobanski & Todd, LLC (57) ABSTRACT

A commercial vehicle wheel includes a wheel hub surface formed with alternating raised and recessed segments that allows mounting two of the wheels upon a single axle hub.

19 Claims, 7 Drawing Sheets

DUAL MOUNTABLE CAST COMMERCIAL VEHICLE WHEELS WITH SPOKES

BACKGROUND OF THE INVENTION

This invention relates in general to commercial vehicle wheels and in particular to dual cast or forged commercial vehicle wheels having spokes.

It is known to mount vehicle wheels upon axle hubs having threaded studs projecting therefrom. The studs extend through apertures formed through a wheel hub and receive wheel nuts to secure the wheels upon the axle hubs. The mounting system may be used to mount a single wheel upon an axle hub, as is the case for automobiles, or a pair of wheels upon a single axle hub, as is commonly used upon commercial vehicles, such as trucks. For a tractor trailer combination truck, dual wheels are typically mounted upon the driven rear wheels of the tractor and upon the axles of the trailer to distribute the weight of the load. When a pair of wheels are mounted upon a single axle hub, the structure is commonly referred to a dual wheel arrangement.

In a dual wheel arrangement, the inner and outer wheels are typically identical with one of the wheels reversed relative to the other wheel. Each wheel includes a wheel disc that extends across the end of an annular wheel rim to allow room within the wheel rim to receive the axle hub and a wheel brake mechanism. The wheel rim is designed to carry a pneumatic tire while the wheel disc typically includes a central hub supported within the wheel rim by a plurality of radially extending wheel spokes. The wheel hub has a plurality of stud-receiving apertures formed therethrough. The apertures are equally spaced about a bolt hole circle with the number of apertures increasing with the size of the wheel. The facing central portions of the wheel discs are flat and designed to contact one another when the wheels are mounted upon the axle hub. The remainder of the disc and the spokes that extends from the central portion to the wheel rim are typically dished.

Prior art wheel discs are typically stamped out of steel and welded to the inner surface of the wheel rim. The steel provides strength while allowing the wheel discs to be made thin enough to permit mounting dual wheels upon an axle hub while maintaining sufficient stud engagement length for the wheel nuts.

In order to reduce the unsprung wheel weight while also allowing for esthetic wheel design, it would be desirable to provide commercial vehicle wheels cast or forged from aluminum alloys or other light weight metals or alloys. Such wheels would include a central wheel hub supported within a wheel rim by a plurality of radially extending wheel spokes. However, to provide sufficient strength, the wheel spokes need to be relatively thick. Furthermore, cast or forged wheel hubs tend to have relatively the same thickness as the wheel spokes. While single cast or forged wheels may be utilized, the doubling of the hub thickness with a dual wheel mounting arrangement may not provide sufficient stud engagement length for the wheel nuts. Accordingly, it would be desirable to provide a design for cast or forged commercial vehicle wheels that would be adaptable for a dual wheel mounting arrangement.

BRIEF SUMMARY OF THE INVENTION

This invention relates to dual commercial vehicle wheels having spokes.

The invention contemplates a commercial vehicle wheel having an annular wheel rim adapted to support a pneumatic tire. The wheel also has a central wheel hub supported within the wheel rim by a plurality of wheel spokes, the hub having a surface formed with alternating raised and recessed segments whereby the wheel may be utilized in a dual wheel mounting configuration. Bolt holes for receiving wheel studs are formed through each of the raised and recessed segments and spaced equally about a bolt hole circle. The wheels may be either cast or forged as one piece wheels or assembled from two or more pieces that include a cast or forged component.

The invention further contemplates a method for mounting a pair of the above wheels upon a single vehicle axle hub. The method includes mounting the first wheel upon the vehicle axle hub with the raised and recessed hub segments facing away from the vehicle axle hub. The second wheel is then positioned adjacent to the first wheel with the raised and recessed hub segments facing toward the vehicle axle hub. The second wheel is rotated about its axis such that the raised segments of the first wheel hub surface are aligned with the recessed segments of the second wheel hub surface. The second wheel is next mounted upon the vehicle axle hub with the raised segments of each wheel hub received by the recessed segments of the other wheel hub. The wheels are then secured upon the vehicle axle hub.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
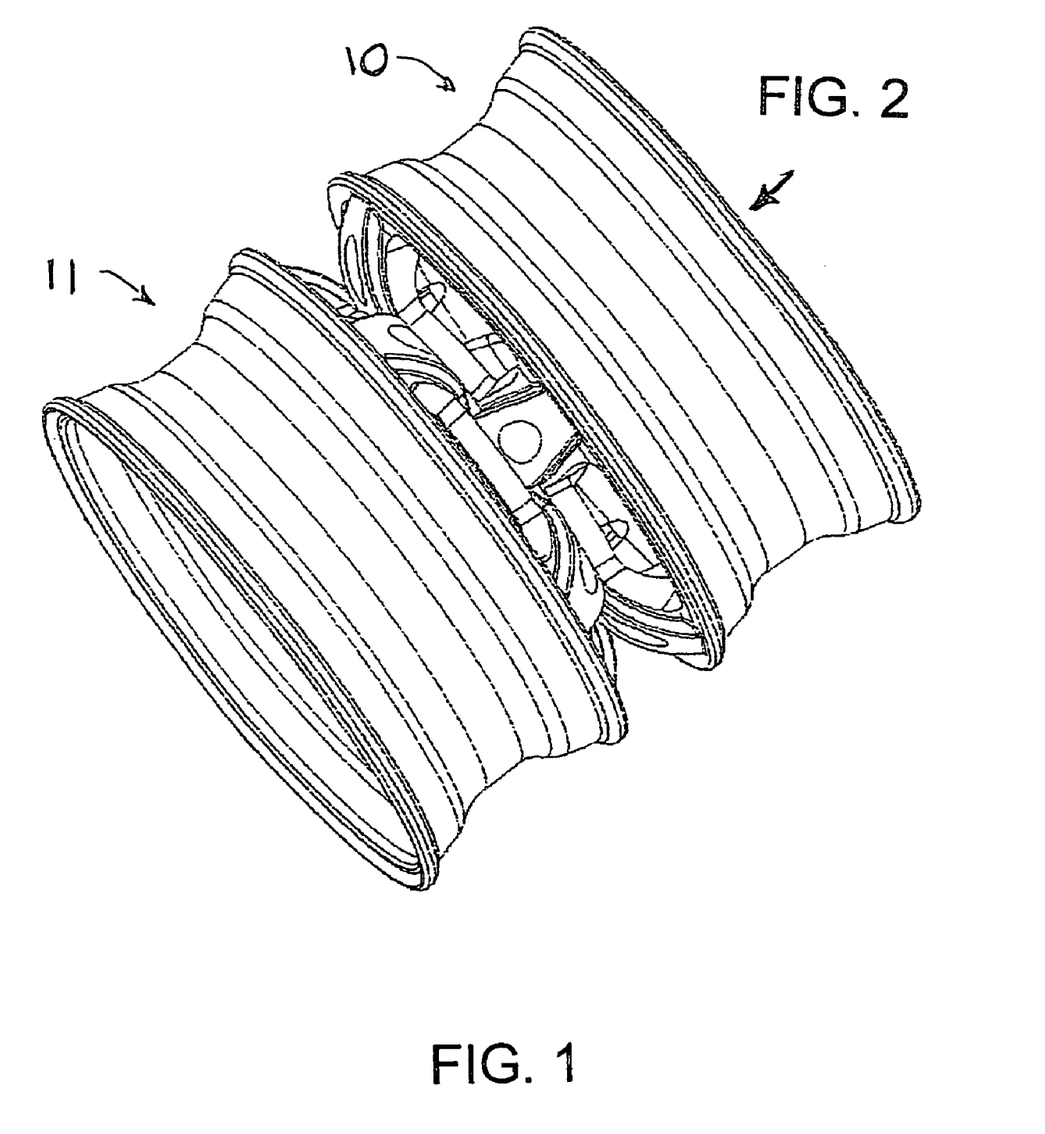
FIG. 1 is an isometric view of a pair of commercial wheels that are in accordance with the invention mounted in a dual wheel arrangement.

Referring now to the drawings, there is illustrated in FIG. 1 a view of first and second cast commercial vehicle wheels 10 and 11, respectively, that are in accordance with the invention. The wheels 10 and 11 are illustrated in a dual wheel mounting arrangement. In the following description, the end of each wheel that faces the other wheel will be referred to as the inner end while the opposite end of each wheel will be referred to as the outer end.

Figure 2:
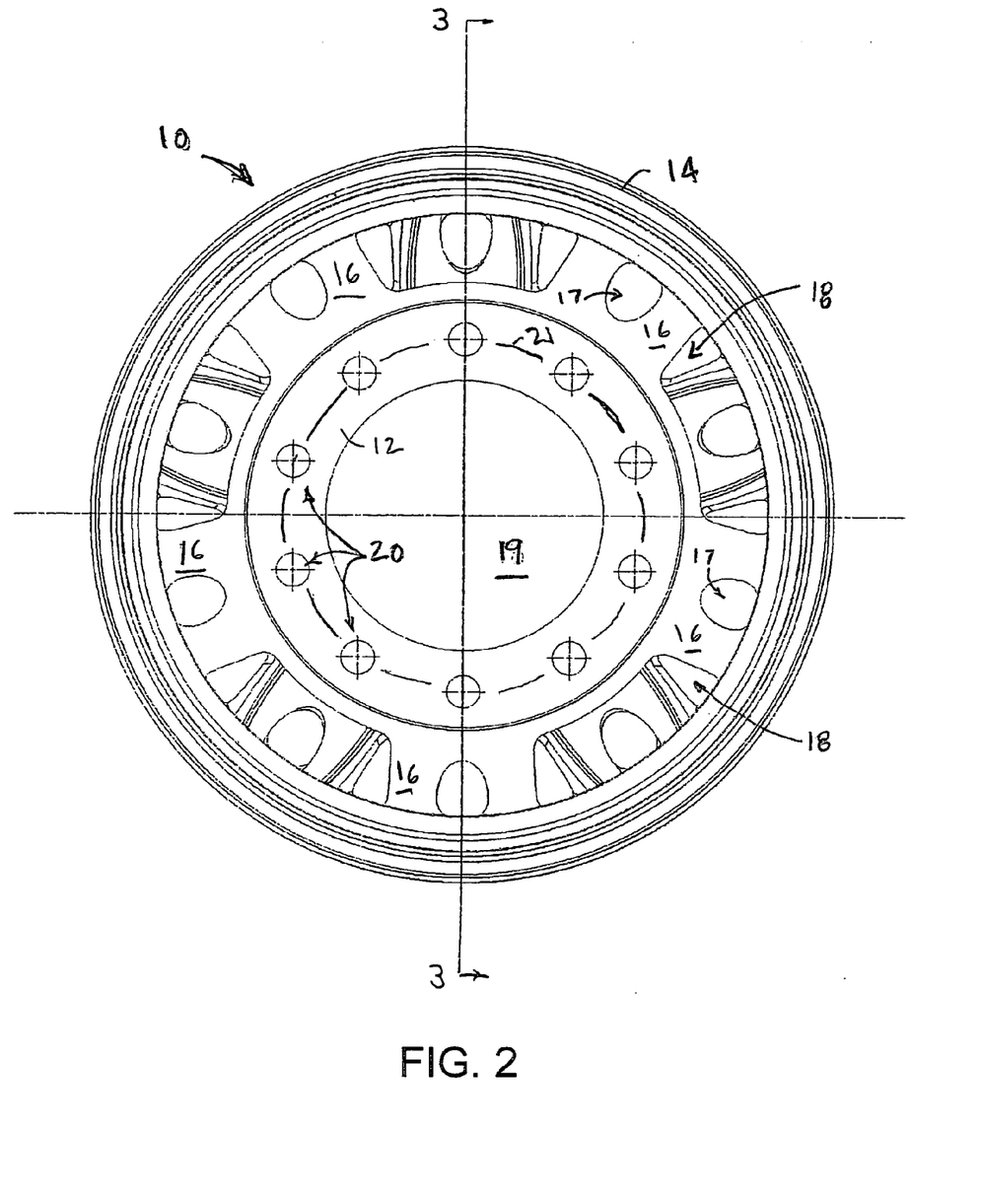
FIG. 2 is an outer end view of one of the cast commercial wheels shown in FIG. 1.

Each of the wheels 10 and 11 is cast by a conventional method, such as gravity or low pressure casting, from a light weight metal alloy, such as, for example an alloy of aluminum, magnesium or titanium. As best seen in the outer end view of the first wheel 10 shown in FIG. 2, the wheel 10 includes a central wheel hub 12 which is supported within a wheel rim 14 by a plurality of radially extending spokes 16. The wheel hub 12 and spokes form a wheel disc that extends across the inner end of the wheel rim 14 to allow a sufficient open volume within the wheel rim to receive an axle hub and a wheel brake mechanism. While five wheel spokes 16 are shown in FIG. 2, it will be appreciated that the invention also may be practiced upon a wheel having more or less spokes than are shown. Additionally, while a specific shape for the radial spokes 16, to include an aperture 17 formed through each spoke, is shown in FIG. 2, it will be appreciated that casting techniques permit forming the spokes with other esthetically pleasing shapes that are not shown. Similarly, the outer end of the wheel rim 14 and the outer surface of the wheel hub 12 also may be cast in other esthetically pleasing shapes than shown; In FIG. 2, spokes of the second wheel 11 are visible through the vent openings 18 formed between the first wheel spokes 16. A pilot hole 19 is formed through the center of the hub 12 and is surrounded by a plurality of wheel stud holes 20 that spaced equally about a bolt hole circle 21 that is concentric with the pilot hole 19. While ten wheel stud holes 20 are shown in FIG. 1, it will be appreciated that the invention also may be practiced upon a wheel having more or less stud holes than are shown. Typical commercial vehicle wheels have from six to ten stud holes.

Figure 3:
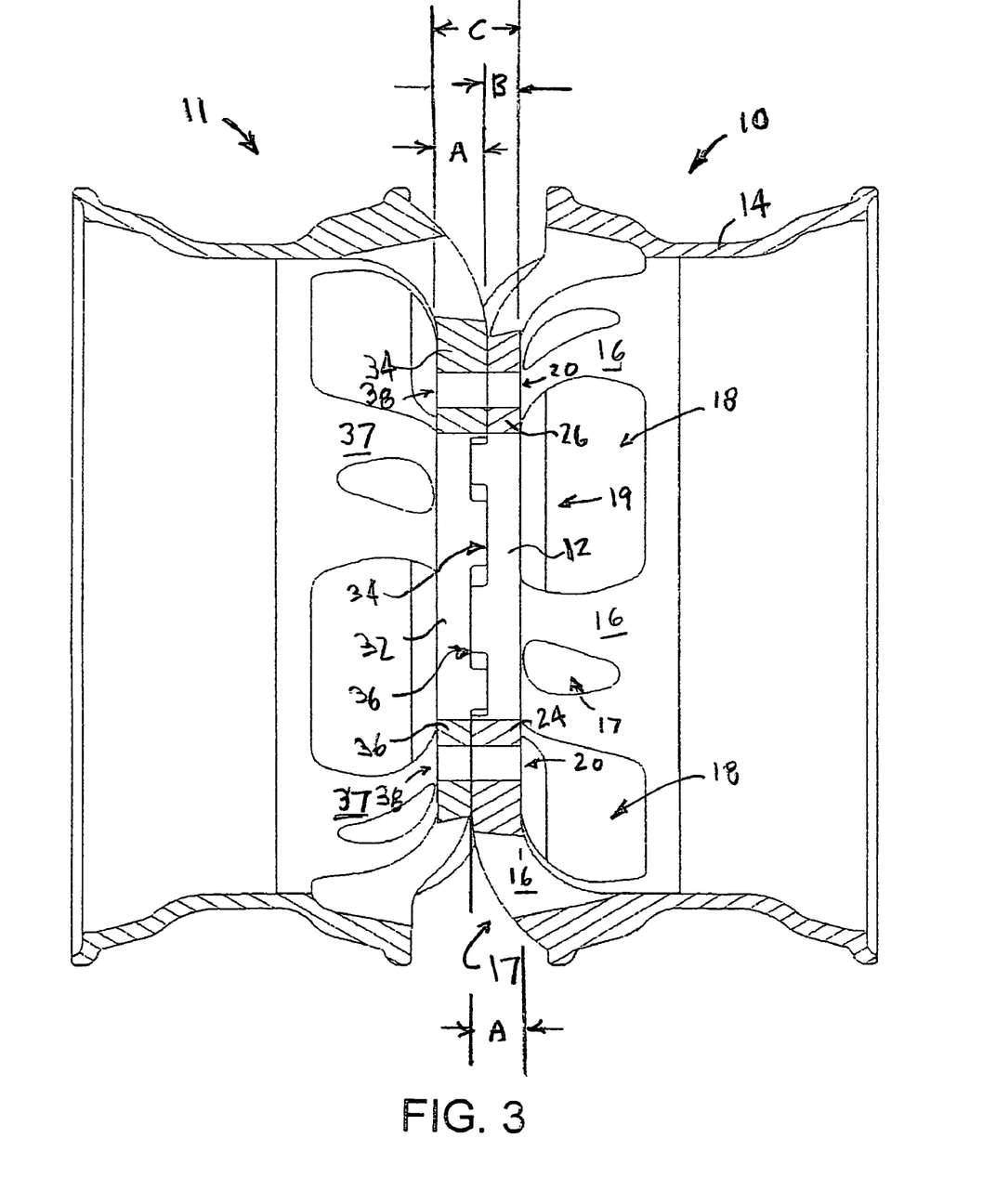
FIG. 3 is a sectional view of the wheels shown in FIG. 1 taken along line 3-3 in FIG. 2.
Figure 4:
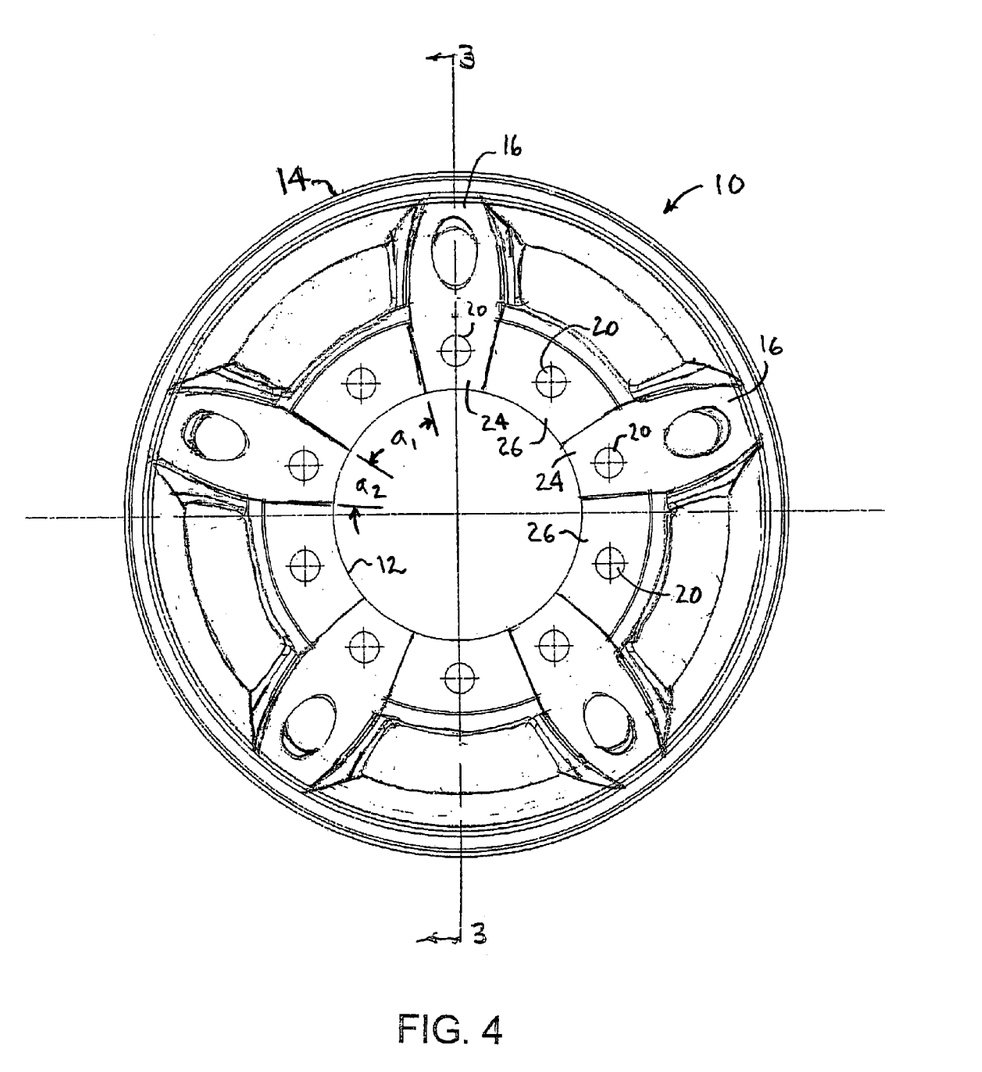
FIG. 4 is an inner end view of the wheel shown in FIG. 2.

As best seen in the sectional view of FIG. 3, where the first wheel 10 is shown on the right and the second wheel 11 is shown on the left, the surface of the first wheel hub 12 that faces the second wheel 11 is formed with a plurality of alternating raised and recessed arcuate shaped segments, 24 and 26, respectively. Each of the raised segments 24 is formed as a continuation of the inner end of one of the wheel spokes 16 and includes a corresponding one of the wheel stud holes 20 that is centered within the segment. As shown in the inner end view of the first wheel 10 shown in FIG. 4, the raised segments 24 extend from the pilot hole 19 to the outer edge of the wheel hub 12, while one of the recessed segments 26 extend between each pair of raised segments 24. Each of the recessed segments 26 also includes a stud hole 20 that is centered within the segment. Because each of the raised segments 24 are formed at the inner end of a corresponding wheel spoke 16, the thickness of the wheel spoke, and thereby the strength of the spoke, is maintained across the wheel hub 12. One of the raised segments 24 is shown in section in the lower portion of FIG. 3 extending in an axial direction to the left while a corresponding recessed segment 26 is shown in section in the upper portion of FIG. 3 extending in an axial direction to the right. In the preferred embodiment, the edge of each segment extends in a radial direction toward the wheel rim 14. Accordingly, the segments have the shape of a truncated sector with an accurate inner edge. As best seen in FIG. 4, inner edge of the raised and recessed segments 24 and 26 define arcs of unequal lengths with the arc length $a_1$ of the recessed segment 26 being greater than the arc length $a_2$ of the raised segment 24. Similarly, the outer edges of the recessed segments 26 also define arcs of having a greater length than an arc that would extend across the inner end of any of the wheel spokes 16. Therefore, the segments 24 and 26 have shapes with sufficient spacing tolerances to allow assembly of two wheels in a dual mounting arrangement as described below. It will be appreciated, however, that the invention also may be practiced with raised and recessed segments having shapes other than those illustrated and described, provided sufficient spacing tolerances are included to allow assembly of the wheels in a dual mounting arrangement.

As shown in FIGS. 1 through 4, the present invention contemplates a dual wheel mounting arrangement in which the second wheel 11 having a central hub 32 is mounted adjacent to the wheel 10 for attachment to a single axle hub (not shown). The surface of the second wheel hub 32 that faces the first wheel 10 also is formed with a plurality of alternating raised and recessed segments, 34 and 36, respectively. Similar to the first wheel 10, each of the raised segments 34 is formed as a continuation of the inner end of one of the second wheel spokes 37 and includes a wheel stud hole 38 that is centered within the segment. Furthermore, each of the recessed segments 36 also includes a stud hole 38 that is centered within the segment. Also similar to the first wheel hub 12, the arc lengths of the recessed segments 36 are greater than the arc lengths of the raised segments 34. Thus, the second wheel 11 is identical to the first wheel 10, but reversed, such that the inner ends of both wheels face one another with the segmented surface of the first wheel hub 12 contacting the segmented surface the second hub 32. Additionally, the invention contemplates that the second wheel 11 is rotated about its axis such that each of the raised segments 24 formed upon the surface of the first wheel hub 12 is received by a corresponding recessed segment 36 formed in the surface of the second wheel hub 32, as illustrated in FIG. 3. Similarly, each of the raised segments 34 formed upon the surface of the second wheel hub 32 is received by a corresponding recessed segment 26 formed in the surface of the first wheel hub 12. Because the wheels illustrated have ten wheel stud holes, the second wheel 32 is rotated thirty-six degrees about its axis relative to the first wheel 10 prior to mounting the wheel 32 upon the axle hub. However, due to the symmetry of the wheels 10 and 11, the stud holes 20 and 38 formed through the hubs 12 and 32 are aligned on both wheels after the rotation. Because the recessed segments have greater arc lengths than the raised segments, each of the raised segments of one wheel is received within the corresponding recessed segment of the other wheel without any interference.

The interlocking hub segments reduce the overall width of the dual wheel centers while allowing the wheel spokes 16 and 37 to have a sufficient thickness to support the vehicle load. As shown in FIG. 3, the thickness of the raised segments 24 and 34 of the first and second wheel hubs 12 and 32, respectively, is the distance "A", which corresponds to the thickness of the associated wheel spoke 16 or 37. The thickness of the representative recessed segment 26 shown for the first wheel 10 is the distance "B", with "B" being less than "A". However, the combined thickness of the two wheel hubs when in a dual mounting arrangement, which is the sum of "A"+"B" and is shown as the distance "C" in FIG. 3. By carefully selecting "A" and "B" the load carrying strength of the wheel is maintained while also providing a total thickness "C" for the combined wheel hubs that allows the wheel studs to extend far enough beyond the bolt holes to provide a sufficient stud engagement length for the wheel nuts. As an example, if "A" is one and a half inches and "B" is one half inch, the total thickness of "C" of the two wheel hubs would be two inches. Without the raised and recessed segments of the invention, the total thickness of the two prior art wheel hubs having the same spoke thicknesses would be three inches, a 50 percent increase over combined the hubs of the wheels that are in accordance with invention.

Figure 5:
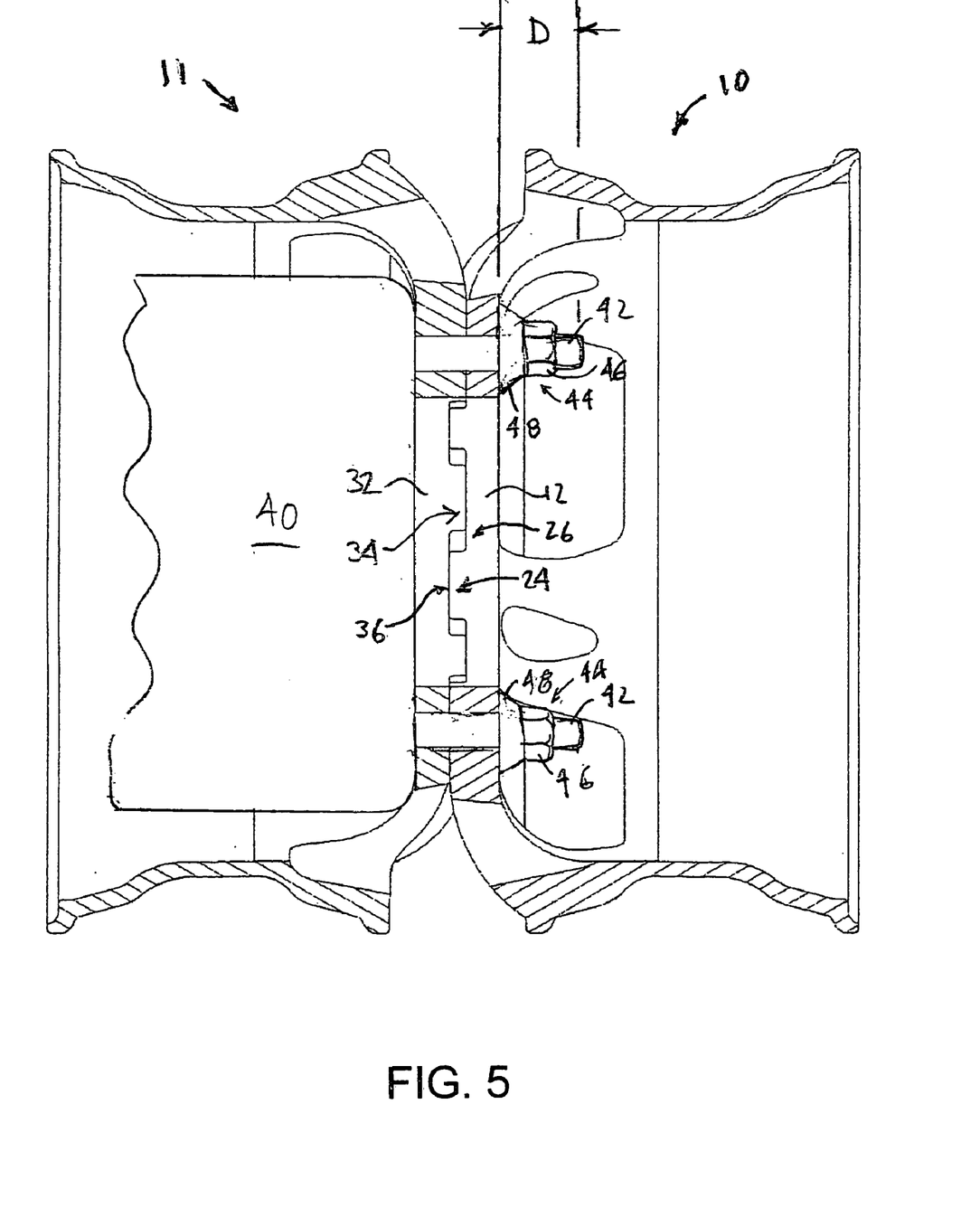
FIG. 5 is a sectional view the wheels shown in FIG. 1 mounted upon an axle hub.

To further illustrate the utility of the invention, the wheels 10 and 11 are shown mounted in a dual wheel mounting arrangement upon an axle hub 40 in FIG. 5, where components that are the same as shown in the previous figures have the same numerical identifiers. For clarity, only two wheel studs 42 are shown in FIG. 5. As shown in FIG. 5, the wheel studs 42 extend from the axle hub 40 and through the stud holes 20 and 38 formed through each of the wheel hubs 12 and 32, respectively. As also shown in FIG. 5, the wheel studs 42 extend beyond the surface of the first wheel hub 12 by a distance "D" that is sufficiently long to meet engagement length requirements that assure a secure attachment of the wheel. The wheels 10 and 11 are retained upon the wheel studs 42 by conventional two piece flange nuts 44. Flange nuts comprise two pieces including a hexagonal body 46 with wrenching surfaces formed around its circumferential perimeter and a washer 48 having a conical outer surface that is rotatably mounted upon the nut body 46. Use of flange nuts provides an increased clamping force to secure the wheels 10 and 11 to the axle hub 40.

It will be appreciated that the wheel 10 also may be mounted as a single wheel upon an axle hub, as is typical for the front steerable wheels of a commercial vehicle. Thus, the same wheel may be used for either single wheel front or dual wheel rear mounting, eliminating the need to provide different wheels for use on the front and rear of the vehicle.

Figure 6:
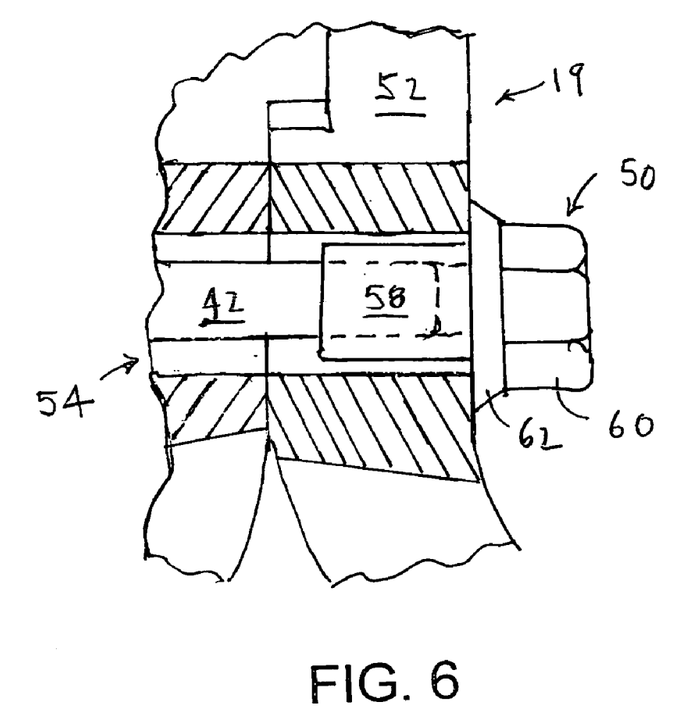
FIG. 6 is a sectional view of a portion of an alternate embodiment of the wheel shown in FIG. 4 that is secured with two piece collared flange nuts.
Figure 7:
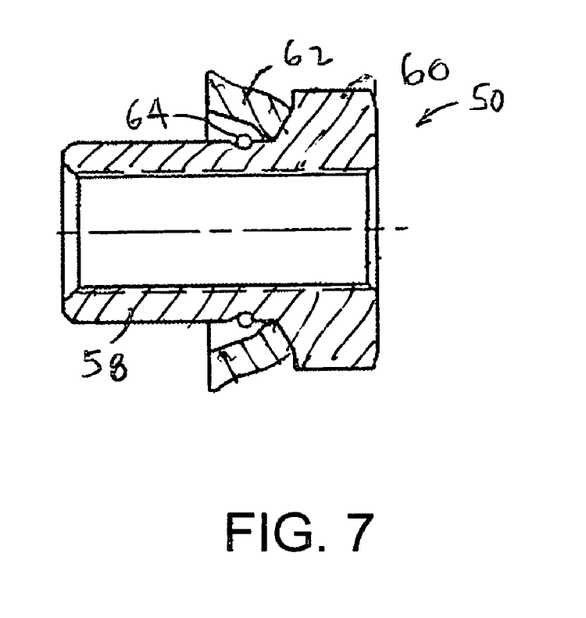
FIG. 7 is an enlarged sectional view of one of the collared flange nuts shown in FIG. 6.

Should the combined hub width of the above described wheels 10 and 11 exceed standard design principles, the present invention also contemplates an alternate embodiment of the wheel hub that allows utilization of conventional two piece collared flange nuts 50 to secure the wheels upon the axle hub. A partial sectional view of an enlarged portion of a wheel hub 52 in accordance with the alternate embodiment is shown in FIG. 6 where components that are similar to components shown in the preceding figures have the same numerical identifiers. The wheel hub 52 includes wheel stud holes 54 with each stud hole having a sufficient diameter to receive a collar 58 that extends axially from a hexagonal body portion 60 of the collared flange nut 50, as shown in the sectional view of the nut in FIG. 7. The hexagonal body portion 60 includes wrenching surfaces formed around its circumferential perimeter. The collar 58 includes an internal threaded bore ,shown with dashed lines in FIG. 6, that extends the threaded length of the nut 50. A washer 62 having a conical outer surface is rotatably carried upon the collar 58 and provides an increased clamping force. As shown in FIG. 7, a spring clip 64 secures the washer 62 upon the collar 58. As shown in FIG. 7, a spring clip 64 secures the washer 62 upon the collar 58; however, other conventional retaining devices or method, such as, for example, staking, also may be utilized. As illustrated in FIG. 6, the nut collar 58 extends into the stud hole and captures the end of the wheel stud 42 engaging a sufficient length of the stud 42, as shown by dashed lines, to meet design requirements. Thus, the use of the collared flange nut 50 allows mounting dual cast wheels that are in accordance with the invention upon conventional wheel studs. It will be appreciated that clearance tolerances for the wheel hubs shown in FIG. 6 are exaggerated for illustrative purposes and that the actual tolerances would be controlled to assure that the wheels are concentric when mounted upon a vehicle.

Figure 8:
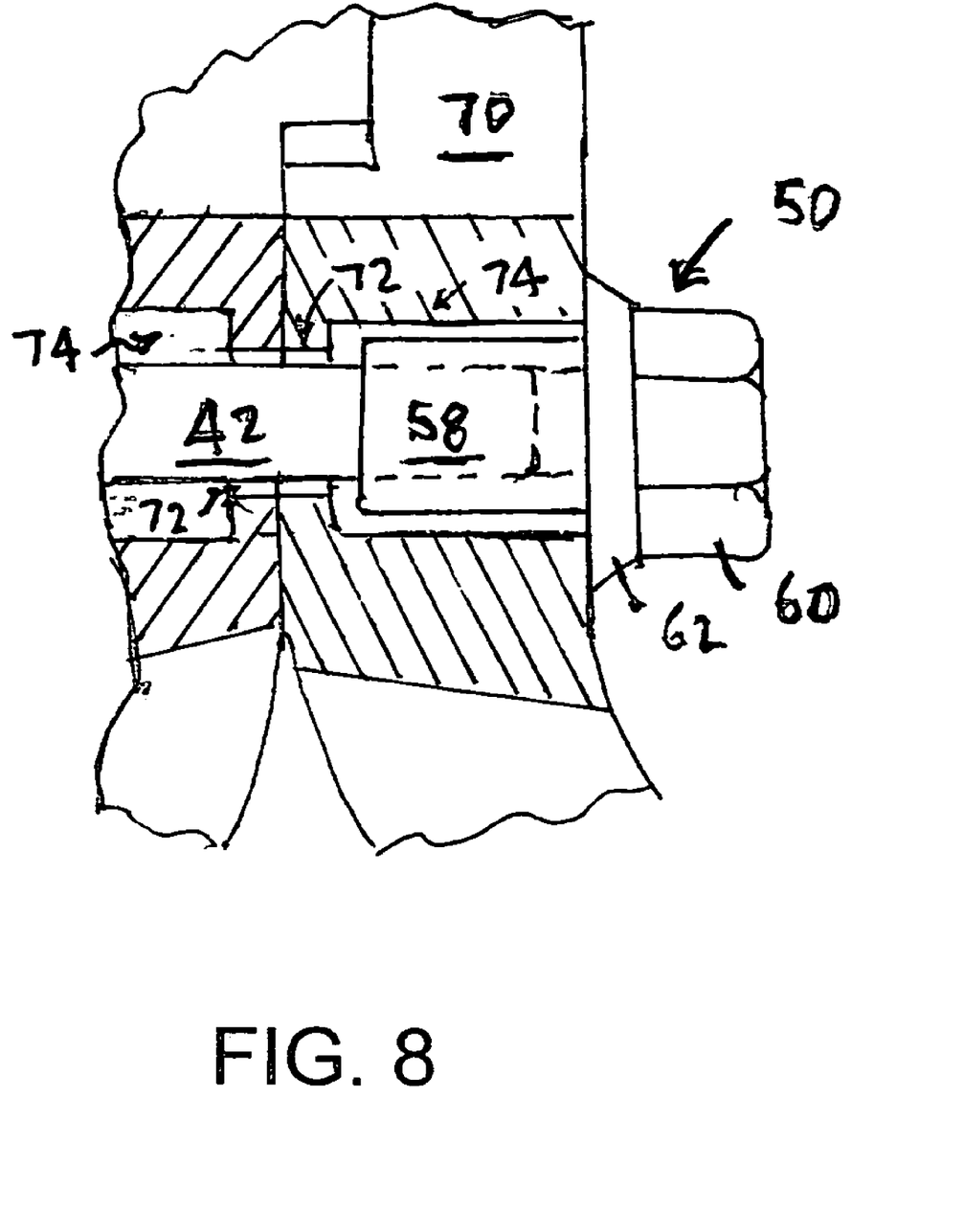
FIG. 8 is a sectional view of a portion of another alternate embodiment of the wheel shown in FIG. 4 that is secured with two piece collared flange nuts

An alternate embodiment of the wheel hub illustrated in FIG. 6 is shown in FIG. 8 and labeled 70. Components shown in FIG. 8 that are similar to components shown in FIG. 6 have the same numerical identifiers. The wheel hub 70 includes stud holes 72 which have counter-bored outer ends 74. The conterbored ends 74 are sufficiently deep to receive the flanged nut collar 58. As also shown in FIG. 8, the counter bored ends 74 are formed in the surface of the wheel hub 70 that is opposite from the segmented hub surface.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope. For example, while the raised and recessed segments formed in the wheel hub surface have been illustrated and described as having radially extending side surfaces, the invention also contemplates utilizing segments having non-radial side surfaces. Thus, for example, the segment side surfaces also may be formed as parallel to one another. Additionally, while the preferred embodiment was illustrated and described with raised hub segments being narrower that the recessed hub segments, it will be appreciated that the invention also may be practiced with the raised hub segments being having widths that are approximately equal to the widths of the recessed hub segments, provided tolerances are maintained to allow the raised segments to be received by the recessed segments. Furthermore, while the preferred embodiment has been illustrated and described for one piece cast vehicle wheels, it will be appreciated that the invention also may be practiced with one piece forged wheels. Similarly, the invention may be practiced with two piece wheels having a cast or forged spider that includes a central hub and a plurality of spokes mounted within a wheel rim that may be cast, forged or rolled from steel stock, or the invention may be practiced with multi-piece wheels.

What is claimed is:

1. A dual set of wheels for mounting upon a commercial vehicle comprising:

a first wheel including a first annular wheel rim adapted to support a first pneumatic tire and a first central wheel hub supported within said first wheel rim by a first plurality of wheel spokes, said first hub having an axis of rotation and a first hub surface that is perpendicular to said axis of rotation, said first hub surface including alternating arcuate shaped segments that are raised and recessed in an axial direction; and a second wheel including a second annular wheel rim adapted to support a second pneumatic tire and a second central wheel hub supported within said second wheel rim by a second plurality of wheel spokes, said second hub having an axis of rotation and a second hub surface that is perpendicular to said axis of rotation, said second hub surface including alternating arcuate shaped segments that are raised and recessed in an axial direction, said recessed segments on said first wheel hub surface being aligned with and receiving said raised segments on said second hub surface for mounting said first and second wheels in a dual wheel mounting configuration.

2. The dual set of wheels in accordance with claim 1 wherein at least one of said first and second plurality of wheel spokes has an inner end terminating upon a portion of a corresponding one of said first and second wheel hubs that includes one of said raised segments.

3. The dual set of wheels in accordance with claim 2 wherein the thickness of the portions of each of said first and second wheel hubs that include said raised segments are approximately the same as the thickness of an adjacent end of an associated wheel spoke whereby the load carrying strength of the wheel is enhanced.

4. The dual set of wheels in accordance with claim 2 wherein said raised and recessed segments are adjacent to one another.

5. The dual set of wheels in accordance with claim 4 wherein each of said first and second wheel hubs also has a pilot aperture formed through the center thereof and further wherein said raised and recessed segments extend radially from said pilot aperture to an outer circumference of each of said hubs.

6. A wheel for a commercial vehicle comprising:
an annular wheel rim adapted to support a pneumatic tire;
a central wheel hub supported within said wheel rim by a plurality of wheel spokes, said hub having an axis of rotation and a surface that is perpendicular to said axis of rotation, said hub surface including alternating arcuate shaped segments that are raised and recessed in an axial direction and are adjacent to one another with one of said wheel spokes having an inner end terminating upon a portion of said wheel hub that includes one of said raised segments such that the wheel may be utilized in a dual wheel mounting configuration, said wheel hub also having a pilot aperture formed through the center thereof and further wherein said raised and recessed segments extend radially from said pilot aperture to an outer circumference of said hub; and
a wheel stud aperture formed through each of said raised and recessed portions of said wheel hub surface.

7. The wheel in accordance with claim 6 wherein each of said stud apertures is equally spaced about a bolt hole circle that is concentric with said pilot aperture.

8. The wheel in accordance with claim 7 wherein at least one of said wheel stud apertures is counter-bored to a sufficient depth to receive a collar extending from an end of a collared flange nut.

9. The wheel in accordance with claim 7 wherein at least one of said wheel stud apertures is bored to a sufficient diameter to receive a collar extending from an end of a collared flange nut.

10. The wheel in accordance with claim 6 wherein each of the raised and recessed segments define an arc length where they intersect said pilot hole and further wherein said arc lengths for said raised segments is less than said arc lengths for said recessed segments.

11. The wheel in accordance with claim 6 wherein the wheel is a cast wheel.

12. The wheel in accordance with claim 6 wherein the wheel is a forged wheel.

13. A method for mounting a dual set of wheels upon a commercial vehicle axle hub comprising the steps of:
(a) providing first and second vehicles wheels, each of the wheels including a central wheel hub supported by a plurality of wheel spokes within an annual wheel rim, the wheel hub having an axis of rotation and a surface that is perpendicular to said axis of rotation, said hub surface including alternating arcuate shaped segments that are raised and recessed in an axial direction;
(b) mounting the first wheel upon the vehicle axle hub with the raised and recessed hub segments facing axially away from the vehicle axle hub;
(c) positioning the second wheel adjacent to the first wheel with the raised and recessed hub segments facing axially toward the vehicle axle hub;
(d) rotating the second wheel about its axis such that the raised segments of the first wheel hub surface are aligned with the recessed segments of the second wheel hub surface;
(e) mounting the second wheel upon the vehicle axle hub with the raised segments of each wheel hub received by the recessed segments of the other wheel hub; and
(f) securing the first and second wheels upon the vehicle axle hub.

14. The method according to claim 13 wherein the wheels provided in step (a) also include wheel stud apertures formed through each of the raised and recessed portions of the wheel hub surfaces, the wheel stud apertures being equally spaced about a bolt hole circle that is centered upon the wheel axis, and further wherein, during step (d), the second wheel is rotated about its axis to also align the wheel stud apertures in the second wheel hub with the wheel stud apertures in the first wheel hub.

15. The method according to claim 14 wherein flanged nuts are used in step (f) to secure the wheels upon the vehicle axle hub.

16. The method according to claim 15 wherein the first and second wheels provided in step (a) have counterbored wheel stud apertures bored through central wheel hubs and further wherein collared flanged nuts are used in step (f) to secure the wheels upon the vehicle axle hub with the nut collars extending into the counterbored portions of the wheel stud apertures.

17. The method according to claim 15 wherein the first and second wheels provided in step (a) have wheel stud apertures bored through central wheel hubs with each of the wheel stud apertures having a sufficient diameter to receive a collar extending from a collared flanged nut and further wherein collared flanged nuts are used in step (f) to secure the wheels upon the vehicle axle hub.

18. The method according to claim 14 wherein the first and second wheels provided in step (a) are cast wheels.

19. The method according to claim 14 wherein the first and second wheels provided in step (a) are forged wheels.

* * * * *